United States Patent
Ravikiran et al.

(10) Patent No.: US 9,567,512 B2
(45) Date of Patent: Feb. 14, 2017

(54) SURFACTANTS FOR ENHANCED OIL RECOVERY

(75) Inventors: Ramakrishna Ravikiran, Centennial, CO (US); Jieyuan Zhang, Littleton, CO (US)

(73) Assignee: Stepan Company, Northfield, IL (US)

( * ) Notice: Subject to any disclaimer, the term of this patent is extended or adjusted under 35 U.S.C. 154(b) by 306 days.

(21) Appl. No.: 14/115,865

(22) PCT Filed: May 14, 2012

(86) PCT No.: PCT/US2012/037842
§ 371 (c)(1),
(2), (4) Date: Nov. 19, 2013

(87) PCT Pub. No.: WO2012/158645
PCT Pub. Date: Nov. 22, 2012

(65) Prior Publication Data
US 2014/0073541 A1  Mar. 13, 2014

Related U.S. Application Data (60) Provisional application No. 61/486,535, filed on May 16, 2011.

(51) Int. Cl.
*C09K 8/584* (2006.01)
(52) U.S. Cl.
CPC .................... *C09K 8/584* (2013.01)
(58) Field of Classification Search
None
See application file for complete search history.

(56) References Cited

U.S. PATENT DOCUMENTS 3,500,923 A * 3/1970 Reisberg ................ C09K 8/584
166/270.1
3,508,612 A   4/1970 Reisberg
(Continued)

OTHER PUBLICATIONS

Zhao, P. et al., "Development of High-Performance Surfactants for Difficult Oils", SPE/DOE Improved Oil Recovery Symposium, Tulsa, OK SPE 113432 Apr. 2008.
(Continued)

*Primary Examiner* — Jeffrey Washville
(74) *Attorney, Agent, or Firm* — Dilworth IP, LLC (57) ABSTRACT

Surfactant compositions useful for oil recovery comprise from 10 to 80 wt. % of a prapoxylated C12-C20 alcohol sulfate, from 10 to 80 wt. % of a C12-C20 internal olefin sulfonate, and from 0.1 to 10 wt. % of an ethoxylated C4-C12 alcohol sulfate. A minor proportion of the ethoxylated alcohol sulfate reduces or eliminates the need to rely on costly cosolvents for achieving good performance in enhanced oil recovery processes. Low interfaoial tensions and low microemulsion viscosities can be achieved when the ethoxylated alcohol sulfate accompanies the propoxytated alcohol sulfate and internal olefin sulfonate. Aqueous concentrates comprising water and the surfactant compositions described above are also disclosed. Dilution of the surfactant composition or aqueous concentrate with water or brine to the desired anionic actives level provides an injectable composition useful for EOR applications. Stable, low-viscosity oil-in-water microemulsions comprising crude oil, water, and the surfactant compositions are also disclosed.

8 Claims, 9 Drawing Sheets

(56) References Cited

U.S. PATENT DOCUMENTS

| | | | |
|---|---|---|---|
| 3,544,613 | A | 12/1970 | Knaggs et al. |
| 3,943,160 | A | 3/1976 | Farmer, III et al. |
| 4,252,192 | A | 2/1981 | Nussbaum et al. |
| 4,252,657 | A | 2/1981 | Barriol et al. |
| 4,460,481 | A | 7/1984 | Schievelbein et al. |
| 4,532,053 | A | 7/1985 | Morita et al. |
| 4,544,033 | A | 10/1985 | Ukigai et al. |
| 4,555,351 | A | 11/1985 | Morita et al. |
| 4,597,879 | A | 7/1986 | Morita et al. |
| 4,608,197 | A | 8/1986 | Kesling, Jr. et al. |
| 4,620,595 | A | 11/1986 | Schutt |
| 4,765,408 | A | 8/1988 | Morita et al. |
| 5,068,043 | A * | 11/1991 | Thigpen ............... C09K 8/584 166/270.1 |
| 5,076,363 | A | 12/1991 | Kalpakci et al. |
| 5,103,909 | A | 4/1992 | Morgenthaler et al. |
| 5,199,490 | A | 4/1993 | Surles et al. |
| 5,284,206 | A | 2/1994 | Surles et al. |
| 5,482,908 | A | 1/1996 | Le-Khac |
| 5,654,261 | A | 8/1997 | Smith |
| 5,847,183 | A | 12/1998 | Schmidt et al. |
| 6,439,308 | B1 | 8/2002 | Wang |
| 2004/0063587 | A1* | 4/2004 | Horton ..................... C09K 8/12 507/100 |
| 2009/0203557 | A1 | 8/2009 | Barnes et al. |
| 2009/0281003 | A1 | 11/2009 | Shahin et al. |
| 2009/0308609 | A1 | 12/2009 | Curole et al. |
| 2010/0282467 | A1* | 11/2010 | Hutchison ............. C07C 303/06 166/305.1 |
| 2011/0059872 | A1 | 3/2011 | Weerasooriya et al. |

OTHER PUBLICATIONS

Levitt, D. et al., "Identification and Evaluation of High Performance EOR Surfactants", SPE/DOE Symposium on Improved Oil Recovery, Tulsa, OK, SPE 100089 Apr. 2006.

Flaaten, A., "Experimental Study of Microemulsion Characterization and Optimization in Enhanced Oil Recovery: A Design Approach for Reservoirs with High Salinity and Hardness", M.S.E. Thesis, 23-31.

* cited by examiner

SURFACTANTS FOR ENHANCED OIL RECOVERY

FIELD OF THE INVENTION

The invention relates to surfactants useful for oil recovery and aqueous concentrates comprising the surfactants.

BACKGROUND OF THE INVENTION

Crude oil development and production from oil bearing formations can include up to three phases: primary, secondary and tertiary (or enhanced) recovery. During primary recovery, the natural energy present in the formation (e.g., water, gas) and/or gravity drives oil into the production wellbore. As oil is produced from an oil bearing formation, pressures and/or temperatures within the formation may decline. Artificial lift techniques (such as pumps) may be used to bring the oil to the surface. Only about 10 percent of a reservoir's original oil in place (OOIP) is typically produced during primary recovery. Secondary recovery techniques are employed to extend the field's productive life and generally include injecting a displacing fluid such as water (waterflooding) to displace oil and drive it to a production wellbore.

Secondary recovery techniques typically result in the recovery of an additional 20 to 40 percent of a reservoir's OOIP. However, even if waterflooding were continued indefinitely, typically more than half of the OOIP would remain unrecovered. Poor mixing efficiency between water and oil (because of high interfacial tension between the water and oil), capillary forces in the formation, the temperature of the formation, the salinity of the water in the formation, the composition of the oil in the formation, poor sweep of the injected water through the formation, and other factors contribute to the inefficiency. Primary and secondary techniques therefore leave a significant amount of oil in the reservoir.

With much of the easy-to-produce oil already recovered from oil fields, producers have employed tertiary, or enhanced oil recovery (EOR), techniques that offer potential for recovering 30 to 60 percent or more of a reservoir's OOIP. Three major categories of EOR have succeeded commercially: thermal recovery, gas injection, and chemical techniques. Thermal recovery introduces heat (e.g., injection of steam) to lower the viscosity of the crude oil to improve its ability to flow through the reservoir. Gas injection uses nitrogen, carbon dioxide, or other gases that expand in a reservoir to push additional oil to a production wellbore. Other gases dissolve in the oil to lower its viscosity and improve its flowability. Chemical techniques inject surfactants (surfactant flooding) to reduce the interfacial tension that prevents or inhibits oil droplets from moving through a reservoir or inject polymers that allow the oil present in the formation to more easily mobilize through the formation.

Chemical techniques can be used before, during, or after implementing primary and/or secondary recovery techniques. Chemical techniques can also complement other EOR techniques. Surfactant flooding includes surfactant polymer (SP) flooding and alkali surfactant polymer (ASP) flooding. In SP flooding, a reservoir is injected with water and/or brine containing ~1 wt. % surfactant and ~0.1 wt. % polymer. ASP flooding includes alkali in addition to the components used in SP flooding. ASP systems typically contain ~0.5 to 1 wt. % alkali, ~0.1 to 1 wt. % surfactant, and ~0.1 to 1 wt. % polymer. Typically, an SP or ASP flood is followed up with an injection of a displacing fluid, e.g., a waterflood and/or polymer "push" fluid. The choice between SP or ASP depends on the acid value of the oil to be recovered, the concentration of divalent cations in the reservoir's brine, the economics of the project, the ability to perform water softening or desalination, and other factors. Alkali sequesters divalent cations in the formation brine and thereby reduces the adsorption of the surfactant during displacement through the formation. Alkali also generates an anionic surfactant (sodium naphthenate soap) in situ in the formation by reacting with naphthenic acids that are naturally present in the crude oil. The use of relatively inexpensive alkali reduces the surfactant retention and hence reduces the amount of surfactant required, and therefore also reduces the overall cost. Alkali can also help alter formation wettability to a more water-wet state to improve the imbibition rate.

In "wettability alteration," another EOR technique, surfactants are introduced into a reservoir, sometimes combined with altering electrolyte concentration, to displace adsorbed oil by effecting spontaneous imbibition of water onto the reservoir rock. This technique does not necessarily require low interfacial tensions between the oil and aqueous phases or the formation of a microemulsion phase. It also does not require a good sweep efficiency of the displacing fluid, and as such could have utility in carbonate reservoirs which can be fractured and typically have poor conformance. Surfactants used in SP and ASP floods have also displayed utility in wettability alteration.

A surfactant system, after injection into an oil bearing formation, takes up crude oil and brine from the formation to form a multiphase microemulsion in situ. When complete, the microemulsion is immiscible with the reservoir crude and exhibits low interfacial tension (IFT) with the crude oil and brine. Commercial surfactant EOR processes achieve ultra-low IFTs (i.e., less than $10^{-2}$ mN/m) to mobilize disconnected crude oil droplets in the formation and create an oil bank where both oil and water flow as continuous phases. IFT changes with salinity, surfactant composition, crude oil composition, formation temperature, and other variables. For anionic surfactants, an optimal salinity exists at which the microemulsion solubilizes equal volumes of oil and water, and at which the microemulsion exhibits nearly equal IFTs with oil and brine. The ultra-low IFT generally exists only in a narrow salinity range that overlaps the optimal salinity for a given microemulsion.

As explained by P. Zhao et al. ("Development of High-Performance Surfactants for Difficult Oils," SPE/DOE Improved Oil Recovery Symposium, Tulsa, Okla., April 2008, SPE 113432), the "selection of surfactants for enhanced oil recovery applications requires laboratory testing with crude oil from the target reservoir and may involve considerable effort to find a suitable surfactant and other . . . components . . . such as polymer, electrolytes, co-surfactant and co-solvent."

Anionic surfactants used in EOR applications have included alkyl aryl sulfonates (AAS), α-olefin sulfonates (AOS), internal olefin sulfonates (IOS), alcohol ether sulfates derived from propoxylated $C_{12}$-$C_{20}$ alcohols, and mixtures thereof. The sulfonates are usually made by reacting an alkylate, α-olefin, or internal olefin with sulfur trioxide in the presence of an inert gas, followed by neutralization. Internal olefin sulfonates uniquely have a polar head and two non-polar tails. Recently, it was reported that IOS derived from internal olefins having a high proportion of 1,2-disubstitution impart performance advantages for EOR applications (see U.S. Pat. Appl. Publ. No. 2010/0282467). In particular, it was found that optimal salinities of microemulsions made from sulfonates derived from internal olefins containing low amounts of trisubstituted olefins are significantly lower than optimal salinities of microemulsions made from sulfonates derived from internal olefins of the same carbon length that contain appreciable amounts of trisubstituted olefins. Internal olefins with high 1,2-disubstitution are conveniently available from metathesis of α-olefin-containing feedstocks, while other internal olefins can be produced by olefin oligomerization, Fischer-Tropsch processes, catalytic dehydrogenation, thermal cracking, and other known processes.

EOR compositions have been made by combining IOS with a nonionic surfactant such as an ethoxylated alcohol or mixtures of an alcohol and an ethoxylated alcohol (see U.S. Pat. Appl. Publ. No. 2009/0203557). According to the '557 publication, a relatively high proportion of the nonionic surfactant (up to 25% based on the amount of IOS used) may be needed to justify its injection into a reservoir. The reference does not suggest combining internal olefin sulfonates with sulfated ethoxylated alcohols or other anionic surfactants.

Among many possible combinations of surfactants, a mixture of an IOS derived from a $C_{15}$-$C_{18}$ olefin and an ether sulfate derived from a propoxylated $C_{16}$-$C_{17}$ alcohol has shown promise in West Texas dolomite core flooding experiments (see D. Levitt et al., "Identification and Evaluation of High Performance EOR Surfactants," SPE/DOE Symposium on Improved Oil Recovery, Tulsa, Okla., April 2006, SPE 100089). The authors investigated propoxylated materials having 3, 5, or 7 PO units per molecule, particularly 7 PO units (see Tables 1 and 2 on p. 7 of the Levitt paper). Typically, about a 3:1 weight ratio of propoxylated $C_{16}$-$C_{17}$ alcohol sulfate to $C_{15}$-$C_{18}$ IOS was used. The authors favored a formulation containing this surfactant blend and 2 wt. % of sec-butyl alcohol as a cosolvent because it exhibited a high solubilization ratio at optimal conditions. When the sec-butyl alcohol was omitted or reduced to 0.5 wt. %, however, the microemulsion was viscous and an optimum solubilization ratio could not be determined (see Table 2). Use of a cosolvent is a common tactic for avoiding high-viscosity or gel-phase microemulsions, broadening the range over which desirably low IFTs are obtained, and/or improving aqueous stability of the chemical components. Although this makes the formulation more robust for field implementation, cosolvents can make the formulation expensive, so their use is preferably avoided or at least minimized.

The EOR industry benefits from identification of new surfactants or surfactant combinations with performance advantages. In particular, surfactants that can promote a low interfacial tension between aqueous and hydrocarbon phases in geologic formations are highly desirable. Also valuable are surfactants that can generate stable, low-viscosity microemulsions with viscous oils, particularly in the absence of turbulent flow conditions. Ideally, good performance could be achieved with reduced reliance on cosolvents, which add considerably to formulation cost.

SUMMARY OF THE INVENTION

In one aspect, the invention relates to surfactant compositions useful for oil recovery. The compositions comprise from 10 to 80 wt. % of a propoxylated $C_{12}$-$C_{20}$ alcohol sulfate, from 10 to 80 wt. % of a $C_{12}$-$C_{20}$ internal olefin sulfonate, and from 0.1 to 10 wt. % of an ethoxylated $C_4$-$C_{12}$ alcohol sulfate.

We surprisingly found that including a minor proportion of the ethoxylated alcohol sulfate reduces or eliminates the need to rely on costly cosolvents for achieving good performance in enhanced oil recovery processes. In particular, we found that low interfacial tensions and low microemulsion viscosities can be achieved when the ethoxylated alcohol sulfate accompanies the propoxylated alcohol sulfate and internal olefin sulfonate.

In another aspect, the invention relates to aqueous concentrates comprising water and the surfactant compositions. Dilution of the surfactant composition or aqueous concentrate with water or brine to the desired anionic actives level, usually 0.01 to 5 wt. %, provides an injectable composition useful for EOR applications.

Further, the invention includes stable, low-viscosity oil-in-water microemulsions comprising crude oil, water, and the surfactant compositions.

DETAILED DESCRIPTION OF THE INVENTION

In one aspect, the invention relates to surfactant compositions useful for oil recovery. The surfactant compositions comprise a propoxylated $C_{12}$-$C_{20}$ alcohol sulfate, a $C_{12}$-$C_{20}$ internal olefin sulfonate, and an ethoxylated $C_4$-$C_{12}$ alcohol sulfate.

Suitable propoxylated $C_{12}$-$C_{20}$ alcohol sulfates are available commercially. For instance, Petrostep™ S1, a product made by reacting a $C_{16}$ alcohol with 7 molar equivalents of propylene oxide (PO) and sulfating the resulting propoxylated alcohol, and Petrostep™ S13C, a product made by reacting a $C_{13}$ alcohol with 7 molar equivalents of PO followed by sulfation, are available from Stepan Company.

Propoxylated $C_{12}$-$C_{20}$ alcohol sulfates can also be synthesized. In one suitable approach, a propoxylated $C_{12}$-$C_{20}$ alcohol is sulfated and neutralized according to well-known methods. The propoxylated alcohol is typically reacted with sulfur trioxide in the presence of an inert gas and sometimes a solvent, which are used to help control the reaction temperature. After the reaction is complete, sodium hydroxide or other base is added to convert sulfonic acid groups to sulfate salts. The sulfate can be diluted with water to provide a desired actives level. For examples of suitable procedures for sulfating propoxylated $C_{12}$-$C_{20}$ alcohols, see U.S. Pat. Nos. 3,544,613, 4,608,197, and 5,847,183, the teachings of which are incorporated herein by reference.

The propoxylated alcohols can be made by reacting the corresponding $C_{12}$-$C_{20}$ alcohol with propylene oxide in the presence of base catalyst such as KOH according to well-known methods. Other catalysts, such as double metal cyanide complexes, can also be used for this purpose (see, e.g., U.S. Pat. No. 5,482,908).

The propoxylated $C_{12}$-$C_{20}$ alcohol sulfates preferably derive from $C_{12}$-$C_{18}$ alcohols, more preferably from $C_{12}$-$C_{14}$ or $C_{16}$-$C_{18}$ alcohols, and they preferably comprise, on average, from 2 to 10, more preferably from 3 to 8, and most preferably from 6 to 8 oxypropylene units.

The amount of propoxylated alcohol sulfate in the surfactant composition is within the range of 10 to 80 wt. %, preferably from 10 to 40 wt. %, most preferably from 20 to 30 wt. %.

A second component of the surfactant composition is a $C_{12}$-$C_{20}$ internal olefin sulfonate (IOS). Suitable internal olefin sulfonates are also commercially available. For instance, Petrostep™ S2, a $C_{15}$-$C_{18}$ IOS, is available from Stepan Company. Additional suitable IOS materials are available from Shell Chemical (Enordet™ internal olefin sulfonates) and other suppliers.

Suitable internal olefin sulfonates can also be prepared by sulfonation of a $C_{12}$-$C_{20}$ internal olefin or mixture of internal olefins according to well-known methods. In one suitable approach, sulfonation is performed in a continuous thin-film reactor maintained at 10° C. to 50° C. The internal olefin or mixture is placed in the reactor along with sulfur trioxide diluted with air. The molar ratio of internal olefin to sulfur trioxide is maintained at a suitable ratio, e.g., from about 0.7:1 to about 1.1:1. The sulfonated derivative of internal olefin or mixture may be neutralized with alkali, e.g., sodium hydroxide, to form the corresponding salt. The reaction is exothermic and the viscosity of the reaction product may depend on the amount of water present. General conditions and processes for sulfonation of olefins are disclosed in U.S. Pat. No. 4,252,192, the teachings of which are incorporated herein by reference.

The internal olefin used as a source for the $C_{12}$-$C_{20}$ IOS can be di-, tri-, or tetrasubstituted with linear or branched alkyl groups. Internal olefin sources can be obtained from a variety of processes, including olefin (e.g., ethylene, propylene, butylene) oligomerization, α-olefin metathesis, Fischer-Tropsch processes, catalytic dehydrogenation of long-chain paraffins, thermal cracking of hydrocarbon waxes, and dimerized vinyl olefin processes. A well-known ethylene oligomerization process is the Shell higher olefin process (SHOP), which combines ethylene oligomerization to form α-olefins, isomerization of the α-olefins to form internal olefins, and metathesis of these internal olefins with butenes or ethylene to form α-olefins of different chain lengths. Commercially available internal olefins made by SHOP typically contain about six mole percent or higher of trisubstituted internal olefins. Internal olefin sulfonates and their preparation are described in many references, including U.S. Pat. Nos. 4,532,053, 4,555,351, 4,597,879, and 4,765,408, and U.S. Pat. Appl. Publ. No. 2010/0282467, the teachings of which are incorporated by reference.

In one aspect, the internal olefin used to make the IOS is produced by metathesis of an α-olefin and has a high proportion of disubstitution and a correspondingly low proportion of trisubstitution. Such internal olefin sulfonates, which are disclosed in U.S. Pat. Appl. Publ. No. 2010/0282467, provide advantages for EOR, including lower optimal salinities.

The internal olefin sulfonate derives from a $C_{12}$-$C_{20}$, preferably from a $C_{15}$-$C_{18}$ internal olefin.

The amount of $C_{12}$-$C_{20}$ internal olefin sulfonate in the surfactant composition is within the range of 10 to 80 wt. %, more preferably from 50 to 80 wt. %, and most preferably from 60 to 75 wt. %.

A third component of the surfactant composition is an ethoxylated $C_4$-$C_{12}$ alcohol sulfate. Suitable ethoxylated $C_4$-$C_{12}$ alcohol sulfates can be obtained from Stepan Company and Shell Chemicals. One example is Stepan's Petrostep™ CS-207, which is made by ethoxylating a $C_6$-$C_{10}$ alcohol with an average of 3 molar equivalents of ethylene oxide (EO), followed by sulfation with sulfur trioxide and neutralization to give a sodium sulfate. Another suitable commercial material is Stepan's Petrostep™ CA-207, which is made by ethoxylating a $C_6$-$C_{10}$ alcohol with an average of 3 molar equivalents of EO, followed by sulfation with sulfamic acid and neutralization to give an ammonium sulfate. Suitable ethoxylated alcohols also include products made by sulfating Shell's Neodol™ N91 and N1 series ethoxylates, e.g., Neodol ethoxylates N91-2.5, N91-5, N91-6, N-91-8, N91-8.4, and N1-9. These products derive from $C_9$-$C_{11}$ alcohols and have an average of 2.5, 5, 6, 8, 8.4, and 9 oxyethylene units, respectively.

Ethoxylated $C_4$-$C_{12}$ alcohol sulfates can also be synthesized from the corresponding "plasticizer" or "oxo" alcohols by reacting the corresponding $C_4$-$C_{12}$ alcohol with EO in the presence of a base catalyst, sulfating the resulting ethoxylated alcohol with sulfur trioxide, chlorosulfonic acid, sulfamic acid, or the like, and neutralizing with sodium hydroxide, lithium hydroxide, potassium hydroxide, ammonia, ammonium hydroxide, or the like. Thus, the sulfate can have any desired cation, e.g., sodium, lithium, potassium, ammonium, alkylammonium, or the like. Preferably, the ethoxylated alcohol sulfate derives from a $C_5$-$C_{11}$ alcohol, more preferably from a $C_6$-$C_{10}$ alcohol. The ethoxylated alcohol sulfate preferably has an average of 1 to 12, more preferably from 2 to 6, even more preferably from 2 to 4, and most preferably about 3 oxyethyene units.

We surprisingly found that a relatively small proportion of the ethoxylated $C_4$-$C_{12}$ alcohol sulfate can significantly improve the effectiveness of the surfactant formulation in an EOR application. In particular, low IFTs (e.g., below $10^{-2}$ mN/m) and low microemulsion viscosities can be achieved with an appropriate crude oil source when the surfactant comprises 0.1 to 10 wt. %, more preferably from 1 to 5 wt. %, and most preferably from 2 to 4 wt. %, of the ethoxylated alcohol sulfate in combination with the propoxylated alcohol sulfate and internal olefin sulfonate. Our results below demonstrate that the advantages can be realized while coincidentally reducing or eliminating the need for a cosolvent (see Comparative Example 1 and Example 2, below), thereby providing a substantial cost benefit.

In a "tight" reservoir, the inventive surfactant composition might be suitable for use without additives, particularly where the surfactant composition acts as a rock-wettability alteration agent or as an injectivity improvement agent. Typical concentrations range from 0.01 to 3 wt. % in these applications. Here, the surfactant can also be used in conjunction with an alkali compound (see list below).

In another aspect, the invention is an aqueous concentrate useful for oil recovery. The aqueous concentrate comprises water and a surfactant composition comprising from 10 to 80 wt. % of a propoxylated $C_{12}$-$C_{20}$ alcohol sulfate, from 10 to 80 wt. % of a $C_{12}$-$C_{20}$ internal olefin sulfonate, and from 0.1 to 10 wt. % of an ethoxylated $C_4$-$C_{12}$ alcohol sulfate. Preferably, the aqueous concentrate comprises from 15 to 85 wt. % water, from 15 to 85 wt. % of the surfactant composition, and from 0 to 50 wt. % of one or more additives selected from the group consisting of co-surfactants, cosolvents, polymers, alkali compounds, oxygen scavengers, and mixtures thereof. These optional additives are described more fully below.

Co-Surfactants

Aqueous concentrates of the invention optionally include a co-surfactant. Suitable co-surfactants include anionic, nonionic, zwitterionic, amphoteric and cationic surfactants. Anionic surfactants include, e.g., internal olefin sulfonates, alkoxylated alcohol sulfates, alkoxylated alcohol sulfonates, alkyl-aryl sulfonates, α-olefin sulfonates, alkane sulfonates, alkane sulfates, alkylphenol sulfates, alkylamide sulfates, alkylamine sulfates, alkylamide ether sulfates, alkylaryl polyether sulfonates, alkylphenol sulfonates, lignin sulfonates, petroleum sulfonates, phosphates esters, alkali metal, ammonium or amine salts of fatty acids (i.e., "soaps"), fatty alcohol ether sulfates, alkyl-ether carboxylates, N-acyl-N-alkyltaurates, arylalkane sulfonates, sulfosuccinate esters, alkyldiphenylethersulfonates, alkylnaphthalenesulfonates, naphthalenesulfonic acid-formaldehyde condensates, alkyl isothionates, fatty acid polypeptide condensation products, sulfonated glyceride oils, fatty acid monoethanolamide sulfates, α-sulfonated fatty acid esters, N-acyl glutamates, N-acyl glycinates, N-acyl alanates, acylated amino acids, and fluorinated anionics. Suitable nonionic surfactants include alkoxylated alkylphenols, alkoxylated alcohols, alkoxylated glycols, alkoxylated mercaptans, long-chain carboxylic acid esters, alkanolamine condensates, alkanolamides, tertiary acetylenic glycols, alkoxylated silicones, N-alkylpyrrolidones, alkylene oxide copolymers, ethoxylated hydrocarbons, fatty amine oxides, fatty acid glycol partial esters, fatty acid alkanolamides, and alkylpolyglucosides. Suitable zwitterionic and amphoteric surfactants include, e.g., $C_8$-$C_{18}$ betaines, $C_8$-$C_{18}$ sulfobetaines, $C_8$-$C_{24}$ alkylamido $C_1$-$C_4$ alkylenebetaines, 3-N-alkylaminopropionic acids, N-alkyl-3-iminodipropionic acids, imidazoline carboxylates, N-alkylbetaines, amidoamines, amidobetaines, amine oxides, and sulfobetaines. Suitable cationic surfactants include, e.g., long-chain amines and corresponding salts, acylated polyamines, quaternary ammonium salts, imidazolium salts, alkoxylated long-chain amines, quaternized long-chain amines, and amine oxides.

Cosolvents

Aqueous concentrates of the invention optionally include a cosolvent. Suitable cosolvents include, e.g., alcohols, ethers, esters, and the like. Lower alcohols, especially $C_2$-$C_5$ alcohols, are particularly preferred. Specific examples of suitable cosolvents include ethyl alcohol, n-propyl alcohol, isopropyl alcohol, isobutyl alcohol, n-butyl alcohol, sec-butyl alcohol, n-pentyl alcohol, sec-amyl alcohol, n-hexyl alcohol, n-octyl alcohol, 2-ethylhexyl alcohol, ethylene glycol n-butyl ether, diethylene glycol n-butyl ether, triethylene glycol n-butyl ether, propylene glycol methyl ether, propylene glycol methyl ether acetate, lauryl alcohol ethoxylates, glycerin, poly(glycerin), polyalkylene alcohol ethers, polyalkylene glycols, poly(oxyalkylene) glycols, poly(oxyalkylene) glycol ethers, and the like, and mixtures thereof. Recovered cosolvents can be used. The cosolvent is typically used in an amount from 0.01 wt. % to 3 wt. %.

Polymers

The aqueous concentrate optionally includes a polymer, which is normally used to help mobilize oil through the formation. Suitable polymers include, e.g., polyacrylamides, partially hydrolyzed polyacrylamides having $M_W$ values of 1 to 30 million (e.g., Flopaam™ 3330S and Flopaam 3838S, products of SNF, or Kypaam™ 5, product of Beijing Hengju), copolymers of acrylamide with aminopropylsulfonic acid or N-vinyl-2-pyrrolidone, polyacrylates, ethylenic copolymers, biopolymers, carboxymethylcellulose, polyvinyl alcohols, polystyrene sulfonates, polyvinylpyrrolidones, 2-acrylamide-2-methylpropane sulfonates, or combinations thereof. Suitable ethylenic copolymers include, e.g., copolymers of acrylic acid and acrylamide, acrylic acid and lauryl acrylate, and lauryl acrylate and acrylamide. Suitable biopolymers include, e.g., xanthan gum, guar gum, scleroglucan, diutan, and the like. Weight average molecular weights ($M_W$) of the polymers preferably range from 10,000 to 30 million. Polymers are typically used at concentrations from 50 to 5000 ppm, preferably from 100 to 2000 ppm, to match or exceed the reservoir oil viscosity under the reservoir conditions of temperature and pressure. It may be desirable to crosslink the polymer in situ in a hydrocarbon-containing formation. Moreover, the polymer can be generated in situ in a hydrocarbon-containing formation. Polymers and polymer preparations for use in oil recovery are described in U.S. Pat. Nos. 6,427,268, 6,439,308, 5,654,261, 5,284,206, 5,199,490 and 5,103,909, the teachings of which are incorporated herein by reference.

Alkali Compounds

An alkali compound can be included in the aqueous concentrate, typically to increase pH, decrease adsorption of surfactants, or achieve optimal salinity. Suitable alkali compounds include alkali metal compounds, e.g., alkali metal hydroxides, carbonates, and borates (e.g., sodium hydroxide, potassium carbonate, sodium carbonate, sodium bicarbonate, sodium metaborate, sodium tetraborate, and the like). Basic organic compounds such as amines (e.g., ethanolamine, triethanolamine) and other compounds that can raise pH or neutralize acids present in the oil can be used instead of the alkali metal compounds indicated above. Organic "alkali" including EDTA, iminosuccinic acid sodium salt, methylglycine diacetate, glutamic acid diacetate, aspartic acid diacetate, hydroxyethylimine diacetate and other such organic species can also be used. The alkali compound is typically used in an amount within the range of 0.01 to 5 wt. %.

Oxygen Scavengers

Suitable oxygen scavengers, typically present at 10 to 500 ppm, include, e.g., ammonium bisulfite, thiourea, sodium bisulfite, sodium dithionite, and the like, and mixtures thereof.

In another aspect, the invention relates to an injectable product useful for EOR applications. The injectable product is made by diluting a surfactant composition or aqueous concentrate of the invention with water or brine to a total anionic actives level within the range of 0.01 to 5 wt. %. As the skilled person appreciates, the surfactants and aqueous concentrates can be manufactured, stored, and shipped in a variety of concentrated forms for subsequent dilution with water or brine to form an injectable fluid. As a concentrate, the formulation typically contains from 15 to 85 wt. % water, from 15 to 85 wt. % of the inventive surfactant composition, and from 0 to 50 wt. % of the optional components. The skilled person will recognize that the amounts of water, surfactant composition, and optional components employed will depend on salinity, crude oil composition, temperature, the particular formation, and many other factors. Thus, the skilled person will normally exercise considerable discretion to select appropriate amounts for each component based on the particular set of variables that may be encountered in a specific oil-bearing formation. The aqueous formulation is normally diluted with water or brine. The resulting injectable product typically contains from 0.01 to 5 wt. %, more preferably from 0.05 to 1 wt. %, of the surfactant composition or aqueous concentrate.

In another aspect, the invention relates to a stable, low-viscosity oil-in-water microemulsion comprising crude oil, water, and a surfactant composition comprising from 10 to 80 wt. % of a propoxylated $C_{12}$-$C_{23}$ alcohol sulfate, from 10 to 80 wt. % of a $C_{12}$-$C_{20}$ internal olefin sulfonate, and from 0.1 to 10 wt. % of an ethoxylated $C_4$-$C_{12}$ alcohol sulfate. Traditional viscosity reducers form weak emulsions that remain emulsified only under turbulent flow conditions. These compositions do not perform well under reservoir conditions or in porous media because of the lack of turbulence. Microemulsions comprising the inventive surfactant compositions have desirable stability even in the absence of turbulent flow conditions.

In another aspect, the invention involves a method comprising using a surfactant composition comprising from 0.1 to 10 wt. % of an ethoxylated $C_4$-$C_{12}$ alcohol sulfate for enhanced oil recovery. Preferably, the ethoxylated alcohol sulfate is a $C_6$-$C_{10}$ alcohol sulfate having an average of 2 to 4, more preferably 3, oxyethylene units. While ethoxylated $C_5$-$C_{11}$ alcohol sulfates are known, they do not appear to have been used at all in EOR applications.

The following examples merely illustrate the invention. Those skilled in the art will recognize many variations that are within the spirit of the invention and scope of the claims.

COMPARATIVE EXAMPLE 1

This comparative example depicts a conventional approach in which a cosolvent is used to aid the performance of the surfactant formulation.

A surfactant formulation is prepared by combining Petrostep™ S1, a product made by reacting a $C_{16}$ alcohol with 7 molar equivalents of propylene oxide and sulfating the resulting propoxylated alcohol (1.76 g, 85% active material, product of Stepan Company), Petrostep™ S2, a $C_{15}$-$C_{18}$ internal olefin sulfonate (2.27 g, 22% active material, product of Stepan), isobutyl alcohol (2.0 g), and tap water (93.96 g). The resulting formulation has a concentration of 2 wt. % surfactant. The surfactant formulation is evaluated in the phase behavior and viscosity tests outlined in greater detail below to evaluate its likely suitability for use in an EOR field test.

Figure 1:
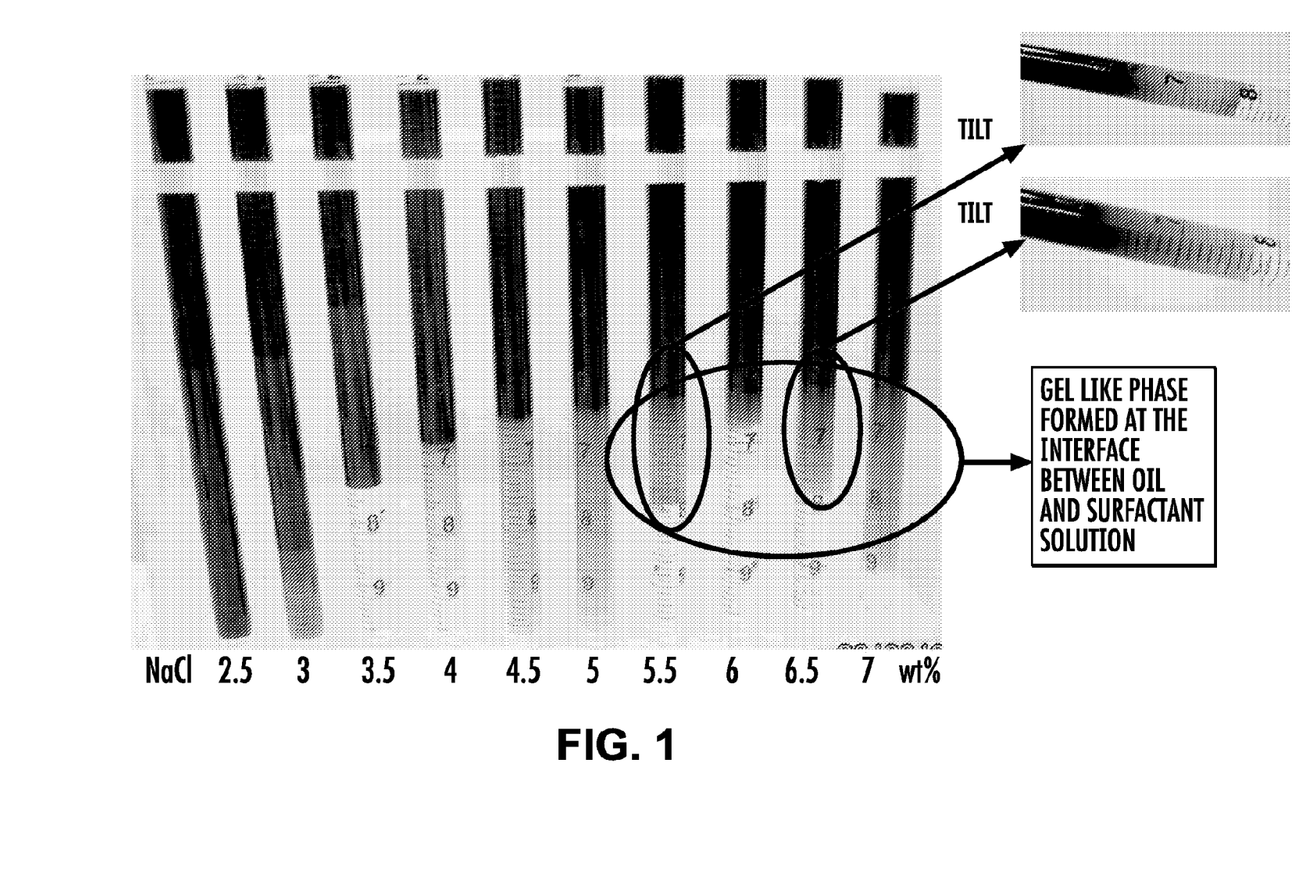
FIG. 1 illustrates phase behavior test results for a comparative surfactant formulation that utilizes a propoxylated alcohol sulfate, an internal olefin sulfonate, and a cosolvent.
Figure 2:
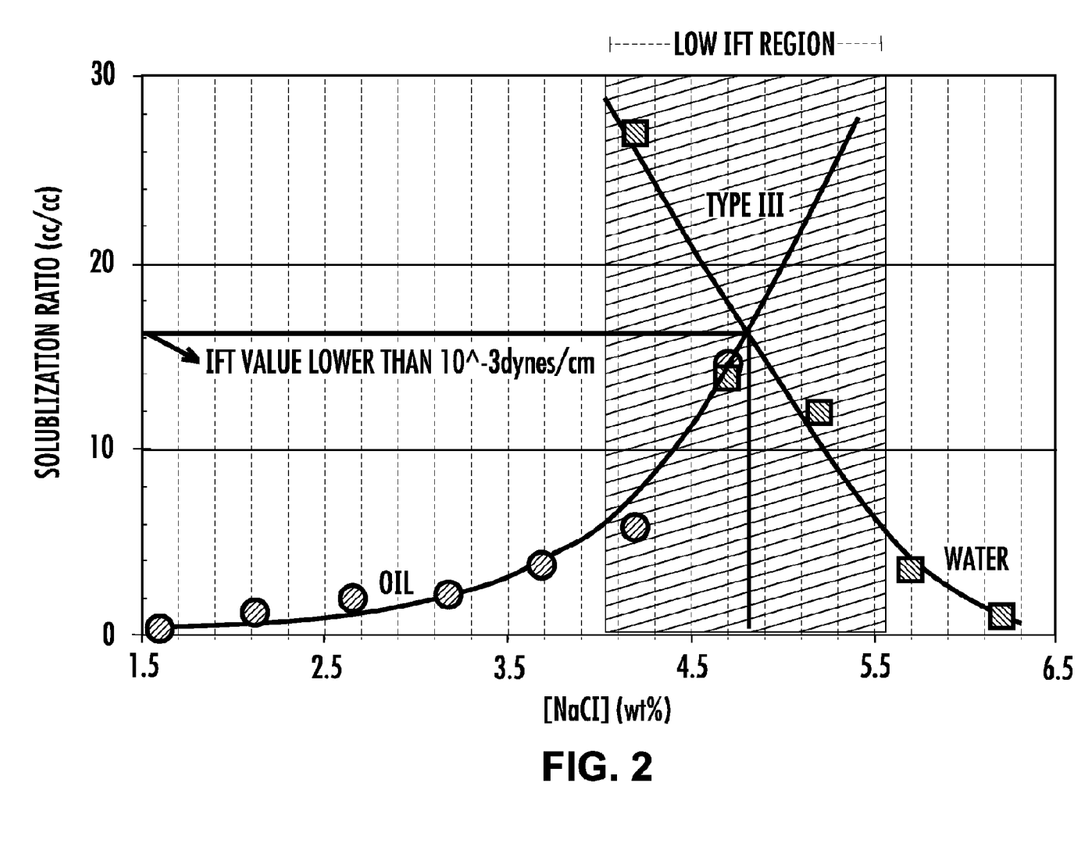
FIG. 2. is a plot of solubilization ratio versus sodium chloride concentration for the comparative surfactant formulation.

FIGS. 1 and 2 illustrate the phase behavior test results for this formulation. The interfacial tension (IFT) values for the formulation are desirably low (<10$^{-3}$ dynes/cm). However, there are two negative indications from the results. First, the low IFT region (FIG. 2, NaCl concentration range=3.9 to 5.6 wt. %) corresponds to a narrow range of salinities. Consequently, this formulation will not be able to deliver a low enough IFT value in zones of a reservoir for which the water salinity is relatively high. Second, as shown in FIG. 1, at higher salinities (>5 wt. % NaCl), a gel-like phase forms at the interface between the oil and surfactant solution. Thus, at higher salinities, conversion of the microemulsion to a gel could cause plugging in the reservoir. Because both of these results are a cause for concern, this surfactant formulation is considered unsuitable for implementation in the field.

Figure 3:
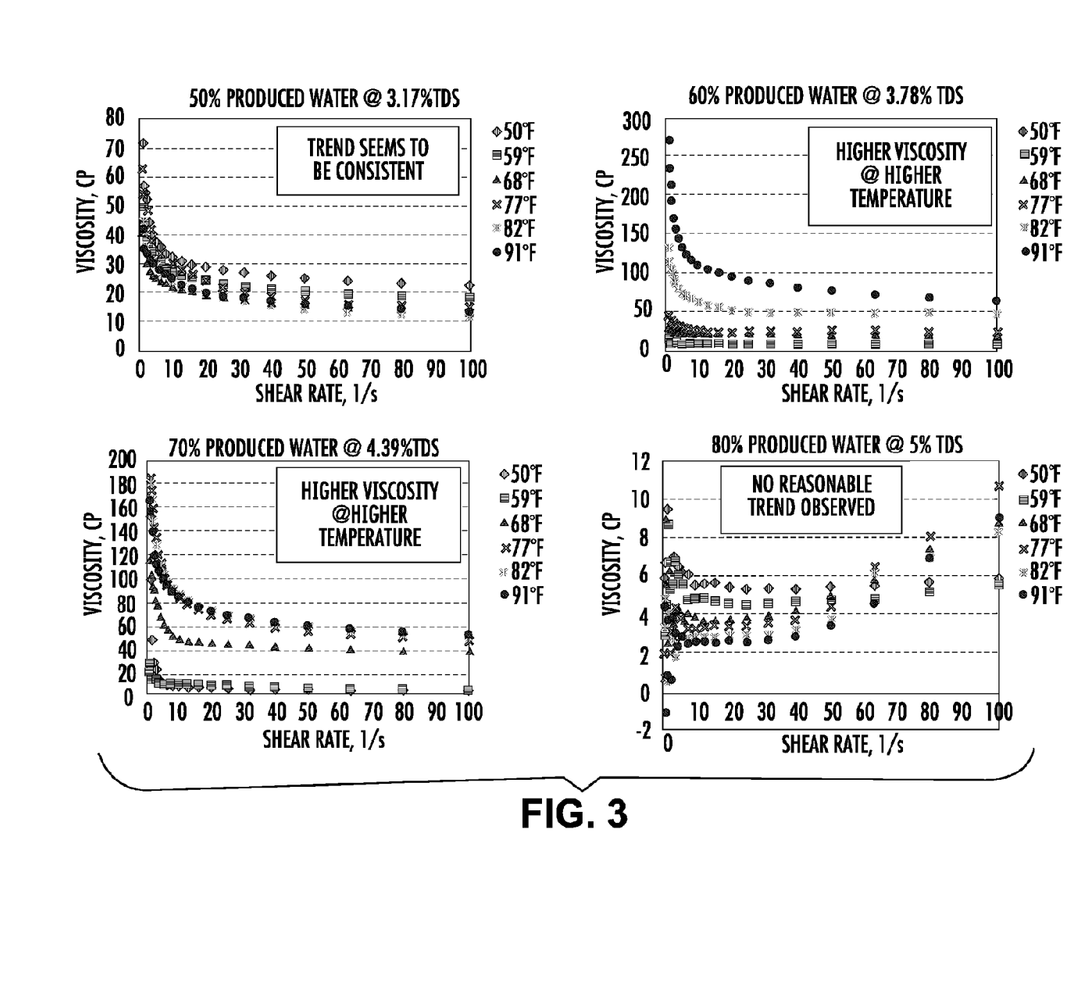
FIG. 3 is a set of four viscosity versus shear rate curves for microemulsions made using the comparative surfactant formulation and shows the impact of temperature and salinity on viscosity.

Microemulsion viscosity results (FIG. 3) raise additional concerns about the comparative formulation. At salinities of 3.78% total dissolved solids (TDS) or higher, there is a substantial and unexpected temperature dependence of the viscosity. In particular, the microemulsion viscosity increases significantly at higher temperatures. This result also makes the formulation unsuitable for field trials.

EXAMPLE 2

This inventive example eliminates the cosolvent while providing superior performance from the surfactant formulation.

A surfactant formulation is prepared by combining Petrostep™ S13C, a product made by reacting a $C_{13}$ alcohol with 7 molar equivalents of propylene oxide and sulfating the resulting propoxylated alcohol (0.49 g, 85% active material, product of Stepan), Petrostep™ S2 (1.18 g, 22% active material, product of Stepan), Petrostep CS-207, a product made by reacting a $C_6$-$C_{10}$ alcohol with 3 molar equivalents of ethylene oxide and sulfating the resulting ethoxylated alcohol (0.04 g, 58% active material, product of Stepan), and tap water (98.29 g). The resulting formulation, which has a concentration of 0.7 wt. % surfactant, is evaluated in phase behavior and viscosity tests to evaluate its likely suitability for use in an EOR field test.

Figure 4:
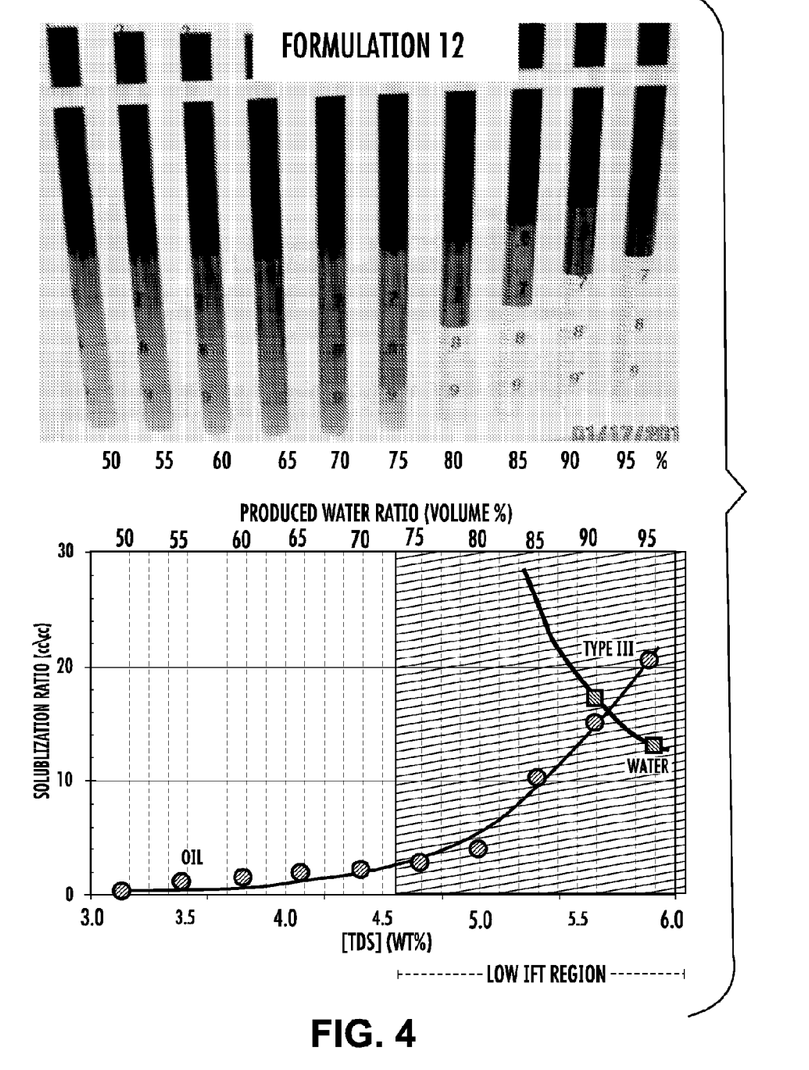
FIG. 4 illustrates phase behavior test results for an inventive surfactant formulation that utilizes a propoxylated alcohol sulfate, an internal olefin sulfonate, and an ethoxylated $C_5$-$C_{11}$ alcohol sulfate, and includes a plot of solubilization ratio versus total dissolved solids (TDS) for the inventive surfactant formulation.

Results of the phase behavior test appear in FIG. 4. The top image shows that no gel phase forms at the interface between the oil and surfactant solution, even at relatively high salinities. Additionally, as shown in the solubilization ratio versus TDS plot, the formulation provides a low IFT region over a much larger range of salinity (all salinities greater than 4.6 wt. % TDS). Thus, the phase behavior results are favorable.

Figure 5:
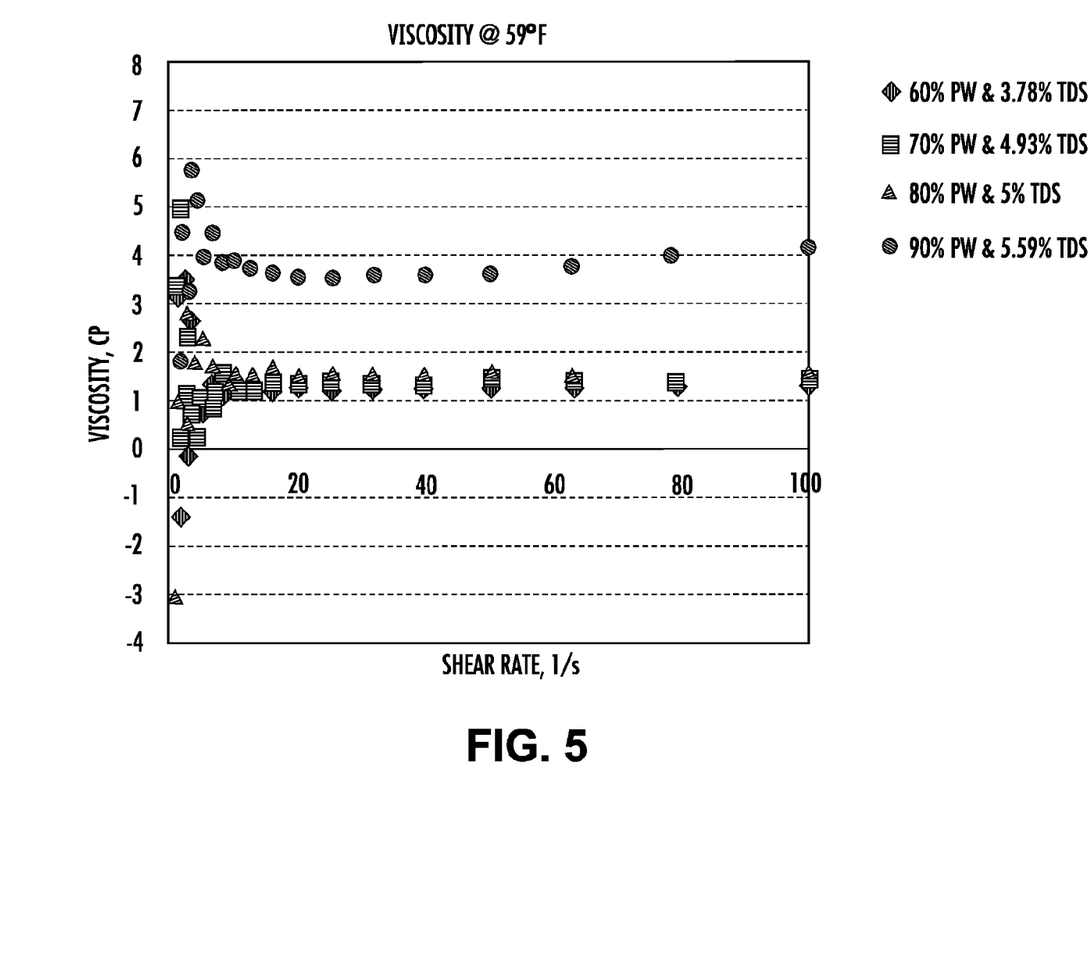
FIG. 5 is set of viscosity curves measured at four different salinities at 59° F. for microemulsions made using an inventive surfactant formulation.
Figure 6:
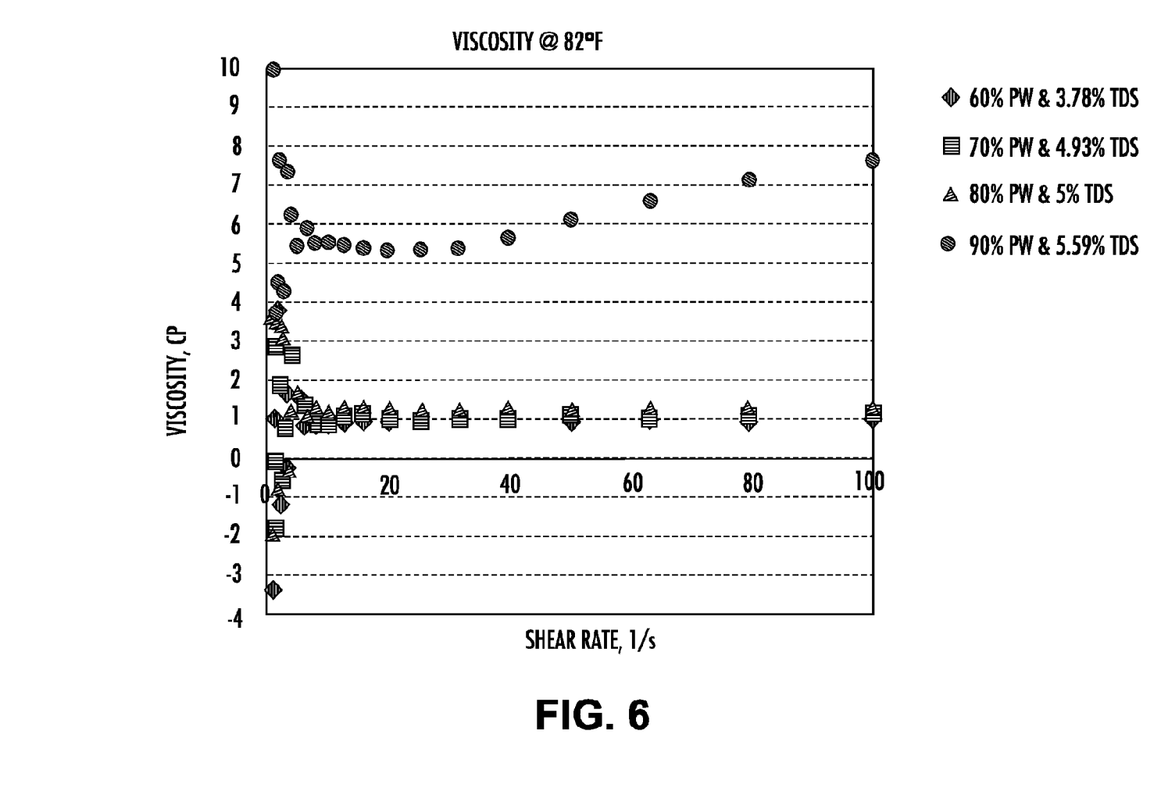
FIG. 6 is set of viscosity curves measured at four different salinities at 82° F. for microemulsions made using an inventive surfactant formulation.

Microemulsion viscosity data (FIGS. 5 and 6) show that viscosity is relatively insensitive to changes in temperature over a wide range of salinities. The increase in viscosity at very high salinity (5.59% TDS or 90% produced water) is acceptable because it is unlikely that the reservoir would see such a high salinity.

In conclusion, this formulation merits further evaluation and potential field implementation.

Phase Behavior Test Procedure

The procedure outined below is adapted from that published by Adam K. Flaaten in an excellent M.S.E. thesis entitled, "Experimental Study of Microemulsion Characterization and Optimization in Enhanced Oil Recovery: A Design Approach for Reservoirs with High Salinity and Hardness" (see, esp. pp. 23-31).

1. Pipette Preparation

A phase behavior experiment involves mixing certain proportions of an aqueous chemical ASP solution (sometimes surfactant only, sometimes alkali and surfactant), salinated water, and crude oil in an array of pipettes. The pipettes used are generally 10 mL borosilicate pipettes with the bottom sealed by a flame torch. The array of pipettes serves to create a salinity gradient, where different volumes of salinated water are added to each pipette to give different salinities. Additionally, equal volumes of aqueous chemical ASP solution are added to each pipette, with this ASP solution having a fixed concentration of surfactant, cosurfactant, cosolvent, polymer, and/or alkali.

2. Order of Addition

Stock solutions added to pipettes have concentrations several times that of the final target concentration and pose a risk if not mixed in an appropriate order. Contact of concentrated electrolyte stock with surfactant stock could adversely affect performance, i.e., could cause permanent precipitation. To minimize this risk, the surfactants stock is added first, followed by fresh water and then produced water. Crude oil is the last component added after aqueous stability is checked and aqueous fluid levels are recorded.

3. Aqueous Stability and Initial Readings

Prior to adding crude oil to pipettes, an aqueous stability check needs to be made for the clarity and homogeneity of all aqueous mixtures. The objective of the aqueous stability test is to determine compatibility of surfactants with electrolytes, and to ensure a stable surfactant slug that will not phase separate or contain precipitates prior to core flood or field injection. As a quick screening during phase behavior testing, aqueous fluids are agitated after being dispensed into pipettes, and then allowed to settle for one hour or more. The fluids in the phase behavior array are visually inspected, and the salinity is recorded at which cloudiness and/or phase separation occurs. After this initial screening, the mixtures are studied in a more-detailed aqueous stability testing where larger volumes containing polymer are assessed in glass vials if a formulation is chosen for further testing. A surfactant/polymer/electrolyte mixture that is injected into core or reservoir rock must be a clear, single-phase mixture.

4. Seal and Mix

After assessing aqueous stability and adding crude oil, the ends of pipettes are heat-sealed with a flame torch. After heat-sealing, the pipettes are allowed to cool before being slowly inverted 3 times to allow the oil and aqueous phases to mix. Slow inversion generates a microemulsion without producing foam. Microemulsion generation from oil and aqueous phases will yield a thermodynamically stable oil-in-water, water-in-oil, or bicontinuous microemulsion phase, and its analysis is the objective of phase behavior experimentation.

5. Measurements and Observations

The prepared pipettes are kept in an oven at a specified reservoir temperature of the field for the duration of the phase behavior experiment. The visual and quantitative assessment of microemulsion properties and interfaces are recorded 1, 2, 3, 5, 7, 10, 14, 21, 30, and 60 days after the pipettes are mixed.

6. Visual Assessment

A qualitative, visual inspection of the pipettes is used to assess the presence of gels or macroemulsion, the fluidity of interfaces, and the microemulsion viscosity. A gel and/or other highly viscous phases may cause plugging of the rock, high surfactant retention, and other problems and thus should be avoided if possible. Careful observation of droplet size and behavior when the pipettes are gently mixed can be used to indicate interfacial activity. In a good formulation, the water-oil mixture at optimal salinity takes a long time to separate after mixing. Most of them also show a uniform brown or grey color.

7. Quantitative Assessment

Pipettes that are free of gels and macroemulsion and have free-flowing interfaces are quantified to calculate phase volumes. Measurement of aqueous/microemulsion and/or microemulsion/oil interface levels are interpolated to the nearest 0.01 mL using the markings on the pipette. From these interface measurements, the volumes of each phase (oil, water, and microemulsion) and the partial volumes of oil and water phases present in the microemulsion can be calculated. Further analyzing and comparing these volumes and volume fractions with respect to salinity and time helps determine optimal salinity, optimal solubilization ratio, and coalescence properties of the microemulsion. Based on this data, solubilization ratio versus salinity curves are drawn.

8. Microemulsion Types

The interaction of an aqueous phase containing surfactant with a hydrocarbon phase will, under some conditions, produce a microemulsion containing surfactant, water, and oil, and this microemulsion has been a focal point for chemical EOR research. Windsor characterized these microemulsions as Type I, Type II, and Type III.

Type I refers to an oil-in-water microemulsion in which a portion of the oil has been solubilized by the surfactant in water. Conversely, Type II defines a water-in-oil microemulsion in which a portion of the water has solubilized by the surfactant in oil. In a Type III microemulsion, the oil and water are both solubilized by the surfactant, which equilibrates with excess oil and water phases. This microemulsion can have varying proportions of oil and water and is assumed to contain essentially all of the surfactant originally in the aqueous phase. All microemulsions are thermodynamically stable by definition, and in theory, will not separate into oil and water constituents.

9. Microemulsion Characterization

Phase behavior microemulsions can be characterized using several different methods. These methods evaluate properties relating to oil and water solubilization proportions, time of coalescence, interfacial tension between fluid phases, viscosity, and conductivity, with the most common method evaluating solubilized oil and water. Healy et al. devised a method to graphically represent the oil and water solubilized in the microemulsion. For each salinity, the volumes of oil ($V_O$) and water ($V_W$) contained in the microemulsion are first measured. The volumes are then normalized to the total volume of pure surfactant ($V_S$) to obtain oil and water solubilization ratio values ($V_O/V_S$ and $V_W/V_S$, respectively). The solubilization ratios are then plotted for each salinity and subsequently fitted with curves to form solubilization curves. The intersection of the oil and water solubilization ratio curves is defined as the optimal solubilization ratio and optimal salinity. (Other variables such as temperature can be used rather than salinity.)

10. Solubilization Ratio

Original oil and water volumes are known from initial aqueous and oil interface readings, and changes in microemulsion interfaces after mixing can determine volumes of oil and water present in the microemulsion. Solubilization ratios of both oil and water can be calculated for each salinity and subsequently plotted to determine trends in the data.

11. Oil Solubilization Ratio

Oil solubilization ratio is the volume of oil present in a microemulsion per volume of total active surfactant originally dispensed in the pipette. The basic equation is:

$$SR_o = \frac{V_1}{V_{surf}}$$

where $SR_O$ is the oil solubilization ratio, $V_1$ is the oil volume present in the microemulsion, and $V_{surf}$ is the total surfactant volume present in the pipette. All of the surfactant is assumed to be in the microemulsion and only active surfactant is used in the calculation.

12. Water Solubilization Ratio

Water solubilization ratio is the volume of water present in a microemulsion per volume of total surfactant originally dispensed in the pipette. The basic equation is:

$$SR_w = \frac{V_2}{V_{surf}}$$

where $SR_W$ is the water solubilization ratio, $V_2$ is the water volume present in the microemulsion, and $V_{surf}$ is the total surfactant volume present in the pipette.

Figure 7:
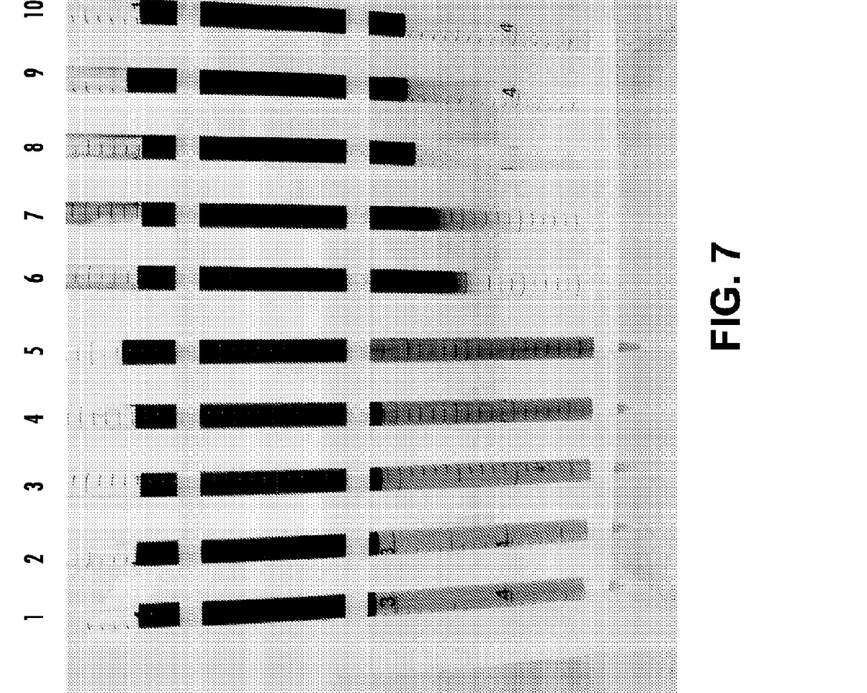
FIG. 7 illustrates a typical phase behavior study.

FIG. 7 illustrates results of a phase behavior test. Tubes 1 to 5 contain a Type I "oil in water" microemulsion, tube 10 has a Type II "water in oil" microemulsion, and tubes 6 through 9 have a Type III microemulsion consisting of three phases. The following volume measurements are made using an ultraviolet lamp, which helps distinguish the different phases.

Taking tube 6 as an example (see FIG. 8), the initial water-oil interface before mixing is located at the dashed line on the pipette (2.04 cm³).

Figure 8:
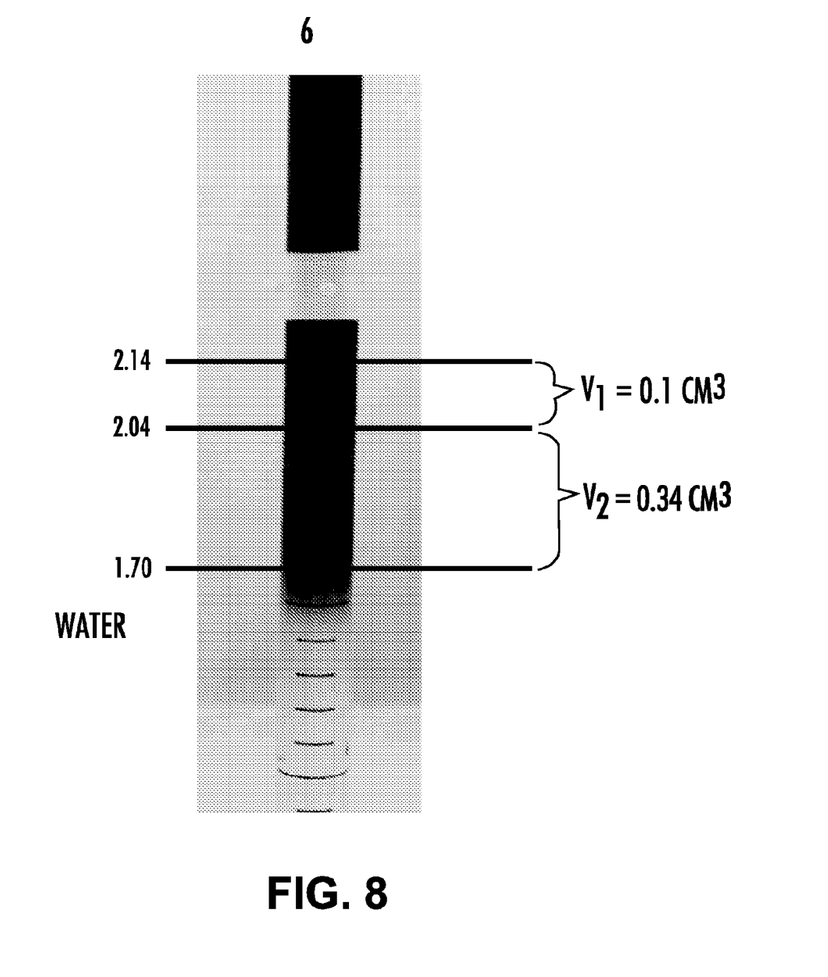
FIG. 8 shows how to calculate a solubilization ratio for one sample pipette.
Figure 9:
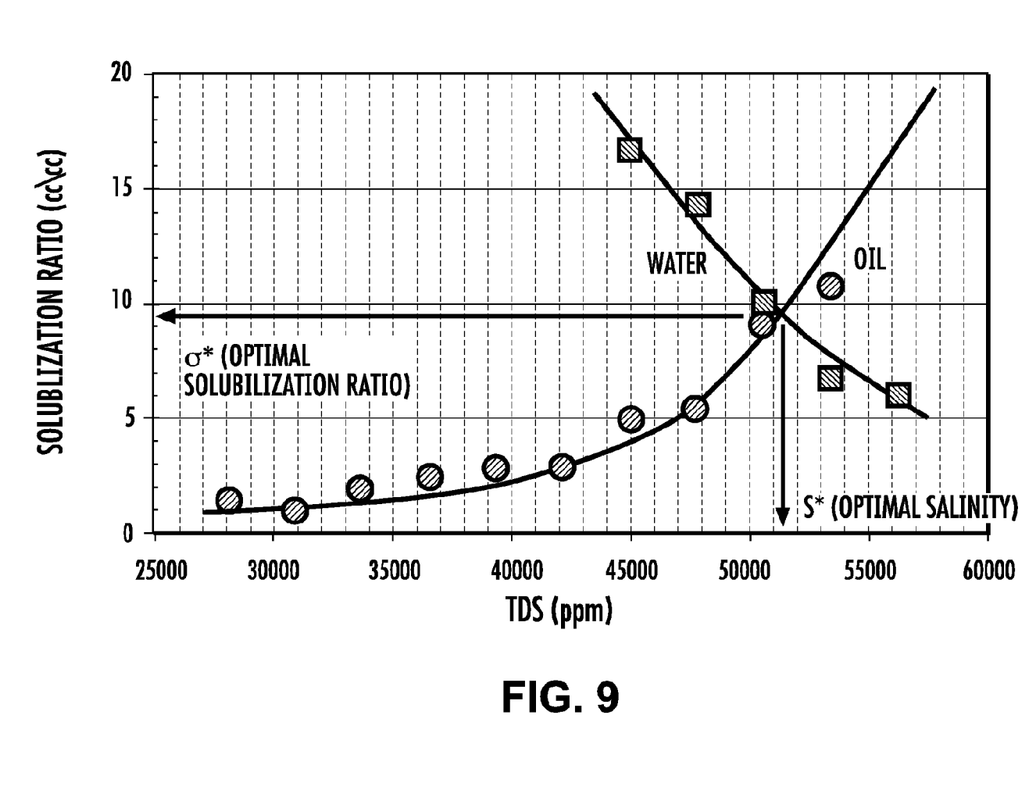
FIG. 9 shows how to determine an IFT at optimal salinity.

After mixing and stabilizing, three phases are separated by the two solid lines shown in the figure.

The volume of the water phase has decreased from 2.04 cm³ to 1.70 cm³ ($V_2$=0.34 cm³), the volume of oil phase has decreased by 0.10 cm³ ($V_1$=0.10 cm³), and the newly formed microemulsion phase has a volume of 0.44 cm³ ($V_1+V_2$).

The solubilization of oil and water are defined as follows:

$$SR_o = \frac{V_1}{V_{surf}} = \frac{V_1}{V_w \cdot C_{surf}}$$

$$SR_w = \frac{V_2}{V_{surf}} = \frac{V_2}{V_w \cdot C_{surf}}$$

$V_{surf}$ is the total volume of surfactant added in the tube, $V_W$ is the total aqueous volume in the tube (2.04 cm³ here), and $C_{surf}$ is the surfactant concentration (1%).

13. Optimum Solubilization Ratio and Salinity

The optimum solubilization ratio is the ratio at which the oil and water solubilization values are equal for the same microemulsion. The corresponding salinity value at the optimum solubilization ratio is called the optimum salinity, and microemulsions at this point of optimum are bicontinuous, Type III microemulsions. The solubilization ratio is a function of salinity.

14. Chun Huh Correlation

The addition of surfactant reduces the interfacial tension (IFT) between oil and water, and this IFT reduction is the mechanism of interest for mobilizing residual oil in chemical EOR. In a pipette containing a Type I microemulsion, the IFT of interest is between the microemulsion and oil phases. The IFT of this microemulsion/oil interface decreases as salinity is increased into the Type III region until the interface disappears at the Type III/Type II salinity boundary. Similarly, a pipette containing a Type II microemulsion will have an aqueous/microemulsion interface and the IFT decreases as the salinity is decreased into the Type III region. Both the aqueous/microemulsion and microemulsion/oil interfaces exist in a Type III environment, and the IFTs of these two interfaces are equal at the optimal salinity. Determining this IFT value at optimal salinity is important for surfactant selection and performance. Huh derived a theoretical relationship between solubilization ratio and IFT at optimum salinity. Huh's equation gives a good estimate of IFT over a wide range of salinity and other variables for a large number of oils including crude oils.

Chun Huh Correlation:

$$\gamma = \frac{C}{\sigma^2}$$

where $\gamma$ is the IFT in dyne/cm, C is a constant, which is usually 0.3 dyne/cm, and $\sigma$ is the solubilization ratio.

The preceding examples are meant only as illustrations. The following claims define the invention.

We claim:
1. A surfactant composition, useful for enhanced oil recovery, consisting of:
 (a) from 10 to 80 wt. % of a propoxylated $C_{12}$-$C_{14}$ alcohol sulfate having an average of 6 to 8 oxypropylene units or a propoxylated $C_{16}$-$C_{18}$ alcohol sulfate having an average of 6 to 8 oxypropylene units;
 (b) from 10 to 80 wt. % of a $C_{15}$-$C_{18}$ internal olefin sulfonate; and
 (c) from 1 to 5 wt. % of an ethoxylated $C_6$-$C_{10}$ alcohol sulfate having an average of 2 to 6 oxyethylene units.
2. The composition of claim 1 consisting of from 10 to 40 wt. % of the propoxylated alcohol sulfate and from 50 to 80 wt. % of the internal olefin sulfonate.
3. The composition of claim 1 consisting of from 20 to 30 wt. % of the propoxylated alcohol sulfate, from 60 to 75 wt. % of the internal olefin sulfonate, and from 2 to 4 wt. % of the ethoxylated alcohol sulfate.
4. An aqueous concentrate useful for enhanced oil recovery, consisting of:
 (a) water; and
 (b) the surfactant composition of claim 1.
5. An injectable product made by diluting the surfactant composition of claim 1 with water or brine to a total anionic actives level within the range of 0.01 to 5 wt. %.
6. An injectable product made by diluting the concentrate of claim 4 with water or brine to a total anionic actives level within the range of 0.01 to 5 wt. %.
7. A stable, low-viscosity oil-in-water microemulsion comprising crude oil, water, and the surfactant composition of claim 1.
8. A surfactant composition, useful for enhanced oil recovery, consisting of:
 (a) from 10 to 40 wt. % of a propoxylated $C_{12}$-$C_{14}$ alcohol sulfate having an average of 6 to 8 oxypropylene units or a propoxylated $C_{16}$-$C_{18}$ alcohol sulfate having an average of 6 to 8 oxypropylene units;
 (b) from 50 to 80 wt. % of a $C_{15}$-$C_{18}$ internal olefin sulfonate; and
 (c) from 1 to 5 wt. % of an ethoxylated $C_6$-$C_{10}$ alcohol sulfate having an average of 2 to 6 oxyethylene units.

* * * * *